United States Patent
Mueller et al.

(10) Patent No.: US 10,449,931 B2
(45) Date of Patent: Oct. 22, 2019

(54) LOCK SYSTEM AND APPARATUS FOR A MOTOR VEHICLE WITH SECONDARY ENERGY STORAGE AND TRANSMISSION FOR EMERGENCY OPERATION

(71) Applicant: Marquardt GmbH, Rietheim-Weilheim (DE)

(72) Inventors: Karl Mueller, Rottweil-Neufra (DE); Wolfgang Stehle, Renquishausen (DE); Stefan Vogel, Dürrheim-Biesingen (DE)

(73) Assignee: Marquardt GmbH, Rietheim-Weilheim (DE)

( * ) Notice: Subject to any disclaimer, the term of this patent is extended or adjusted under 35 U.S.C. 154(b) by 0 days.

(21) Appl. No.: 15/801,747

(22) Filed: Nov. 2, 2017

(65) Prior Publication Data

US 2018/0118166 A1   May 3, 2018

Related U.S. Application Data

(63) Continuation of application No. PCT/EP2016/059973, filed on May 4, 2016.

(30) Foreign Application Priority Data

May 4, 2015   (DE) .......................... 10 2015 005 549

(51) Int. Cl.
*B60R 25/24*   (2013.01)
*B60R 25/40*   (2013.01)
(Continued)

(52) U.S. Cl.
CPC .......... *B60R 25/406* (2013.01); *B60R 25/248* (2013.01); *B60R 25/40* (2013.01);
(Continued)

(58) Field of Classification Search
CPC ....... B60R 16/00; B60R 16/033; B60R 25/04; B60R 25/24; B60R 25/245; B60R 25/246;
(Continued)

(56) References Cited

U.S. PATENT DOCUMENTS 5,552,641 A    9/1996  Fischer et al.
5,736,793 A    4/1998  Jahrsetz et al.
(Continued)

FOREIGN PATENT DOCUMENTS

DE    43 29 697 A1    3/1995
DE    43 40 260 A1    4/1995
(Continued)

OTHER PUBLICATIONS

English translation of International Preliminary Report on Patentability (Chapter I) (Application No. PCT/EP2016/059973) dated Nov. 16, 2017, 6 pages.
(Continued)

*Primary Examiner* — Quan-Zhen Wang
*Assistant Examiner* — Stephen R Burgdorf
(74) *Attorney, Agent, or Firm* — Burr & Brown, PLLC

(57) ABSTRACT

A lock system for access authorization in a motor vehicle, having a first device which has at least two states and is embodied as a control device, and having an associated second device which is embodied in the manner of an electronic key, an ID signal transmitter, a chip card or the like. The two devices have transmitters and/or receivers for electromagnetic signals. At least one of the signals transmitted between the second device and the first device is an encoded operating signal for authenticating the second device, with the result that after a positive evaluation of the transmitted operating signal when the second device is authorized it is possible to bring about a change in the state of the first device.

7 Claims, 5 Drawing Sheets

(51) Int. Cl.
*E05B 49/00* (2006.01)
*E05B 77/48* (2014.01)
*E05B 81/78* (2014.01)
*G07C 9/00* (2006.01)

(52) U.S. Cl.
CPC .............. *E05B 49/00* (2013.01); *E05B 77/48* (2013.01); *E05B 81/78* (2013.01); *G07C 9/00309* (2013.01); *G07C 2009/00507* (2013.01); *G07C 2009/00619* (2013.01)

(58) Field of Classification Search
CPC ..... B60R 25/248; B60R 25/40; B60R 25/406; E05B 49/00; E05B 77/48; E05B 81/78; G07C 9/00174; G07C 9/00182; G07C 9/00309; G07C 9/00944; G07C 2009/00507; G07C 2009/00619; G07C 2009/00793; G07C 2209/63
USPC ...................................... 340/426.36
See application file for complete search history.

(56) References Cited

U.S. PATENT DOCUMENTS

| | | | |
|---|---|---|---|
| 5,841,363 | A | 11/1998 | Jakob et al. |
| 2002/0130763 | A1* | 9/2002 | Aslanidis ................ B60R 25/24 340/5.61 |
| 2003/0071714 | A1* | 4/2003 | Bayer ................ G07C 9/00309 340/5.2 |
| 2008/0296978 | A1 | 12/2008 | Finkenzeller et al. |
| 2009/0293565 | A1* | 12/2009 | Seki ........................ E05B 35/00 70/387 |
| 2010/0102943 | A1 | 4/2010 | Rutledge et al. |
| 2011/0115605 | A1* | 5/2011 | Dimig ...................... B60L 1/00 340/5.61 |
| 2013/0293348 | A1 | 11/2013 | Obergfell |
| 2014/0152091 | A1* | 6/2014 | Muller .................. B60R 25/403 307/10.1 |
| 2015/0298630 | A1* | 10/2015 | Iwai ...................... B60R 16/033 320/135 |
| 2015/0330116 | A1* | 11/2015 | Dente .................... B60L 58/12 307/10.1 |
| 2016/0207499 | A1* | 7/2016 | Geissenhoener ....... B60R 25/04 |
| 2016/0225203 | A1* | 8/2016 | Asmar ............... G07C 9/00309 |

FOREIGN PATENT DOCUMENTS

| | | |
|---|---|---|
| DE | 44 03 655 A1 | 8/1995 |
| DE | 195 30 721 A1 | 2/1997 |
| DE | 10 2004 039 649 A1 | 3/2006 |
| DE | 10 2006 002 119 A1 | 7/2006 |
| DE | 10 2005 035 934 A1 | 2/2007 |
| DE | 10 2007 044 871 A1 | 4/2009 |
| DE | 10 2011 117 978 A1 | 5/2012 |
| EP | 1 378 401 A1 | 1/2004 |
| EP | 1 533 450 A1 | 5/2005 |
| WO | 99/42331 A1 | 8/1999 |
| WO | WO 2013/013824 A1 * | 1/2013 ........... B60R 16/033 |

OTHER PUBLICATIONS

German Search Report (Application No. 10 2015 005 549.6) dated Apr. 7, 2016.
International Search Report and Written Opinion (Application No. PCT/EP2016/059973) dated Aug. 19, 2016.

* cited by examiner

LOCK SYSTEM AND APPARATUS FOR A MOTOR VEHICLE WITH SECONDARY ENERGY STORAGE AND TRANSMISSION FOR EMERGENCY OPERATION

CROSS REFERENCE TO RELATED APPLICATIONS

This application is a continuation of International Application No. PCT/EP2016/059973 filed May 4, 2016, which designated the United States, and claims the benefit under 35 USC § 119(a)-(d) of German Application No. 10 2015 005 549.6 filed May 4, 2015, the entireties of which are incorporated herein by reference.

FIELD OF THE INVENTION

The present invention relates to a lock system and apparatus having a lock system to eliminate the need for an emergency key and lock.

BACKGROUND OF THE INVENTION

In the case of increased safety requirements, electronic lock systems are used which operate, for example, by means of electromagnetic waves. In particular in the case of motor vehicles, such lock systems are used as door lock systems for access authorization.

Such lock systems are known from DE 43 40 260 A1. The lock system is composed of a first device, which has at least two states and is embodied as a control device for locking and/or unlocking the car doors, the tailgate or the like, and an associated second device which is embodied in the manner of an electronic key. The two devices have, for their intended operation, transmitters and/or receivers for transmitting electromagnetic signals. During the intended operation, at least one signal can be transmitted between the key and the control device as an encoded operating signal for authenticating the key with the result that after positive evaluation of the transmitted operating signal and therefore when the key is authorized it is possible to bring about a change in the state of the control device.

In the motor vehicle, there is a chargeable vehicle battery for supplying the electrical components of the motor vehicle with electrical energy. This vehicle battery, therefore, also serves as a first energy store for supplying energy to the first device for the intended operation thereof. In the key, there is also a key battery which generally cannot be charged, as a second energy store for supplying energy to the second device for the intended operation thereof. In the case of an exhausted vehicle battery or an exhausted key battery, the lock system is not functionally capable, with the result that access to the motor vehicle is no longer possible. For this emergency situation, a mechanical lock which permits access to the motor vehicle by means of a mechanical emergency key has been integrated into the car door until now. However, the mechanical lock and the mechanical emergency key are costly and merely provide a low level of protection against theft.

SUMMARY OF THE INVENTION

The present invention is based on the object of developing the lock system in such a way that the mechanical lock and the mechanical emergency key can be dispensed with.

In the lock system according to the present invention, an energy transmission means, and, in particular, a coil of the type of an LF (Low Frequency) coil, for transmitting energy from the first energy store is assigned to the first device. The second device comprises a transponder such that energy can be transmitted from the first energy store to the second device by means of the energy transmission means, for the emergency operation of the second device when the second energy store is exhausted. Therefore, access to the motor vehicle is made possible when a key battery is flat. Furthermore, the first device is assigned an emergency battery with such a storage capacity that when the first energy store is exhausted the energy of the emergency battery is sufficient for the emergency operation of the first device with at least one one-off, in particular, however, one repeated change in the state of the first device. In the case of a flat vehicle battery, the at least one-off access to the motor vehicle is therefore also made possible. Therefore, an emergency access to the motor vehicle is advantageously made possible without the need for a mechanical lock or a mechanical emergency key.

For the purpose of particularly ergonomic operator control of the emergency access by the user, the energy transmission means, and in particular the coil of the type of an LF (Low Frequency) coil, can be arranged in an integrated fashion on a lock element, that is to say, in particular, in the region of the door handle in and/or on the car door. When the second energy store is exhausted the encoded operating signal for authenticating the second device can easily be transmitted by means of the transponder and the energy transmission means in addition to the energy supply by means of the energy transmission means for the second device. Therefore, the communication between the key and the motor vehicle and the energy supply for the key when the key battery is flat is advantageously made possible at the same time. The key is for this purpose merely held in front of the door handle and an automatic communication, including the authentication thereof, starts. The door is unlocked by the vehicle electronics. An emergency key is, therefore, no longer necessary for this case.

When the first energy store is exhausted, the encoded operating signal for authenticating the second device can easily be transmitted by means of the transponder and the energy transmission means. If the vehicle battery is, therefore, flat, but the key battery is functional, the key is then consequently held in front of the door. Pressing the radio remote-control button on the key causes the transponder to communicate actively with the coil which is integrated in the vehicle handle or in the door handle. In this context, the receiver side in the door is supplied by the small emergency battery if the vehicle battery can no longer supply sufficient energy. An emergency key is, therefore, no longer necessary for this case either.

In a cost effective way, the transponder can be a passive RFID (Radio Frequency Identification) transponder. The transponder preferably operates with an RFID frequency in the LF (Low Frequency) range, that is to say in the kilohertz range with, for example, 120 or 125 kHz. However, if desired, the transponder can also operate with an RFID frequency in the megahertz or gigahertz range. In order to ensure a high level of functional reliability for the emergency access, the state of the emergency battery can be monitored by means of a diagnostic control unit. As result, the emergency battery can be replaced, when necessary, which may occur, for example, within the scope of servicing operations for the motor vehicle.

A door lock with a locking and/or unlocking mechanism can be arranged in a compact fashion in the lock element, and in particular in the car door. Furthermore, an actuator can be operatively connected to the locking and/or unlocking mechanism. Finally, the actuator can trigger the locking and/or unlocking mechanism for the door lock after positive authentication of the second device.

In a further refinement, the access authorization and/or driving authorization for the motor vehicle can be activatable, and, in particular, in the manner of a keyless entry/go functionality, by means of the second device. When the second energy store is exhausted, the driving authorization can be activatable by means of the transponder. A further energy transmission means, in particular a coil of the type of an LF (Low Frequency) coil can be provided in a compact fashion in the motor vehicle for transmitting energy from the first energy store to the second device. In order to ensure particularly ergonomic operator control by the user, the further energy transmission means can be arranged in the region of the center console. Therefore, in an emergency, starting of the vehicle when the key battery is flat is also made possible. The necessary energy for this is made available by the first energy store by means of the LF coil in the center console.

The present invention also makes available an apparatus having a lockable and/or unlockable lock element and having an electronic lock system. The lock element can be a door such as a house door for a building, a folding lid for a container, a car door for a motor vehicle or the like. The lock system comprises a first device which has at least two states and is embodied as a control device, and an associated second device which is embodied in the manner of an electronic key, an ID signal transmitter, a chip card or the like. The two devices have, for their intended operation, transmitters and/or receivers for, in particular, electromagnetic signals. In particular at least one of the signals transmitted between the second device and the first device is an encoded operating signal for authenticating the second device. Therefore, after a positive evaluation of the transmitted operating signal when the second device is authorized it is possible to bring about a change in the state of the first device. A first energy store for supplying energy to the first device for the intended operation thereof as well as a second energy store for supplying energy to the second device for the intended operation thereof are provided. Furthermore, an energy transmission means, and in particular a coil of the type of an LF (Low Frequency) coil, for transmitting energy from the first energy store is assigned to the first device. The second device comprises a transponder such that energy can be transmitted from the first energy store to the second device by means of the energy transmission means, for the emergency operation of the second device when the second energy store is exhausted. Finally, the first device is assigned an emergency battery with such a storage capacity that when the first energy store is exhausted the energy of the emergency battery is sufficient for the emergency operation of the first device with at least one one-time change in the state of the first device. If desired, the storage capacity of the emergency battery can also be of such a size that a repeated change in the state of the first device in the emergency operation is possible.

The following is to be noted for a particularly preferred refinement of the lock system according to the present invention.

A system for unlocking the vehicle door for the emergency is to be made available. In normal operation, the door is unlocked by the radio remote-control of the key and the actuator which is triggered as result in the vehicle. A precondition for this is the presence of sufficient energy in the key in order to emit the radio message and also sufficient energy on the vehicle side to operate the control units and/or actuators to perform the unlocking process.

In the event of the vehicle battery being flat or in the event of the key battery being flat, a mechanical lock has hitherto been integrated in the driver's door. A mechanical emergency key, which fits the mechanical vehicle lock is integrated in the key. The object of the present invention is to eliminate the need for the emergency key and the lock.

A transponder in the key also serves to start the vehicle in the center console when the key battery is flat. The necessary energy comes from an LF coil in the center console. A similar coil is integrated into the region of the door handle and ensures the communication and the energy supply for the key when the key battery is flat. For this purpose, the key is held in front of the door handle and starts automatic communication including authentication. The door is unlocked by the vehicle electronic system. An emergency key is no longer necessary for this case.

If the vehicle battery is flat but the key battery is functional, the key is also held in front of the door handle. Pressing the radio remote-control button on the key causes the transponder to communicate actively with the coil which is integrated in the door handle of the vehicle. The receiver side in the door is supplied by a small battery if the vehicle battery can no longer supply sufficient energy. This small battery is dimensioned in such a way that a plurality of unlocking cycles are possible. The state of the small battery in the door is monitored by the vehicle diagnostics, and where necessary the small battery is replaced during the service. The receiver and the vehicle key authenticate one another. Subsequently, an unlocking mechanism in the door lock is triggered in the door handle by the receiver using an actuator. An emergency key or a mechanical lock is not necessary for this case either.

The case in which both batteries are flat, that is to say both the vehicle battery and the key battery are exhausted at the same time, is very improbable. Therefore, this case does not need to be considered further.

The emergency access system according to the present invention can be used not only for motor vehicles but also as an emergency system for unlocking other locked objects.

The advantages which are achieved with the invention consist, in particular, in the fact that the mechanical emergency key previously integrated in the vehicle key can be dispensed with. Furthermore, the motor vehicle manufacturer eliminates the need for the previously necessary mechanical lock on the vehicle door. Therefore, a cost-effective lock system, in particular with keyless functionality, is made available.

BRIEF DESCRIPTION OF THE DRAWINGS

Exemplary embodiments of the present invention with various developments and refinements are illustrated in the drawings and will be described in more detail below.

DETAILED DESCRIPTION OF THE INVENTION

Figure 1:
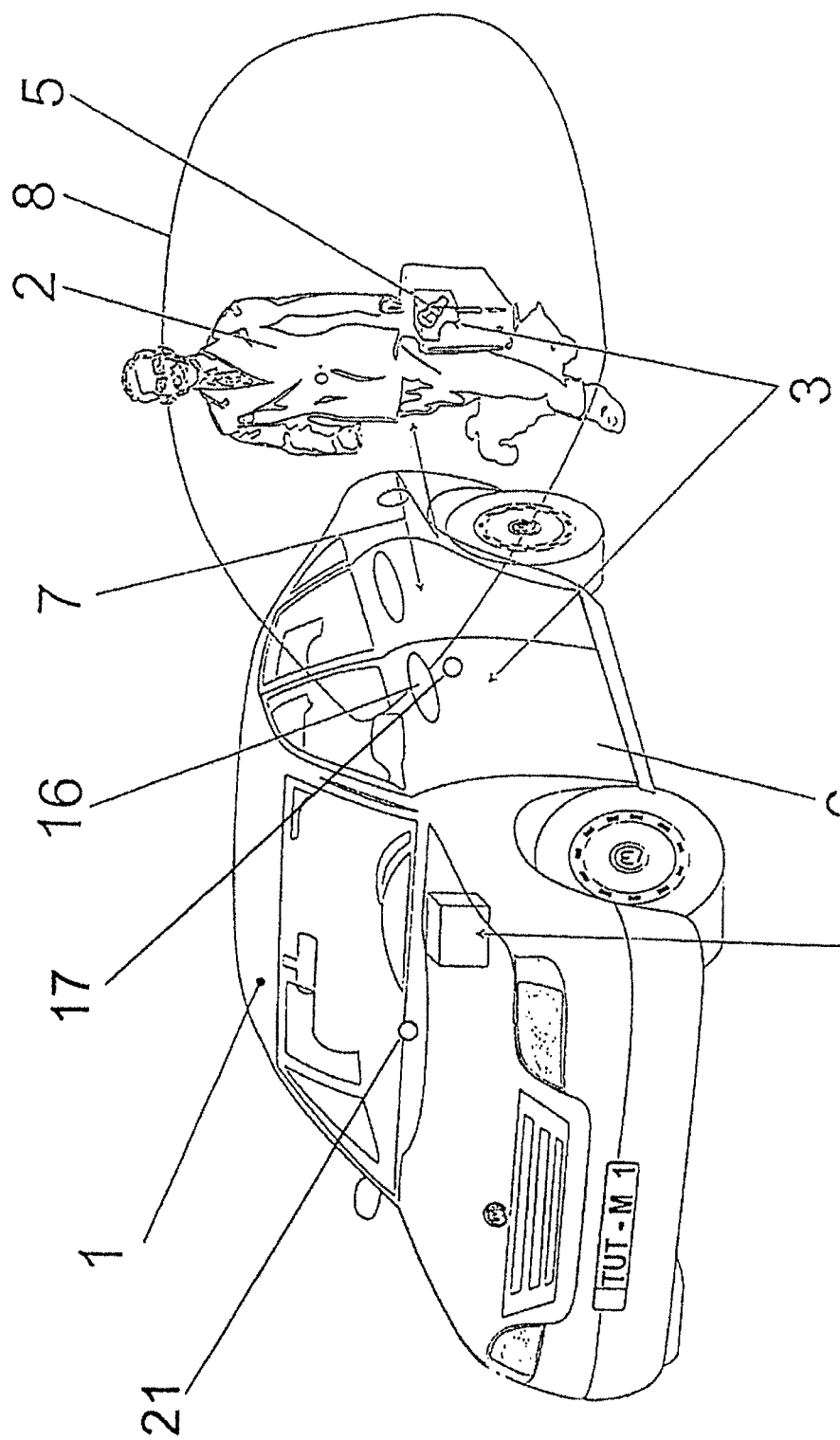
FIG. 1 shows a motor vehicle which is equipped with a lock system.

FIG. 1 shows a motor vehicle 1 with the authorized user 2. The motor vehicle 1 is provided, for access authorization, with a lock system 3 as a door lock system which comprises a first device 4, embodied as a control device, and an associated second device 5. The second device 5 is embodied in the manner of an electronic key, an identification (ID) signal transmitter, a chip card, a smart card or the like. The second device 5 is in the possession of the authorized user 2, by which means the user 2 has access to the motor vehicle 1 within an effective range 8.

The first device 4 has at least two states, wherein in the first state locking of the car doors 6 occurs, and in the second state unlocking of the car doors 6 occurs. The two devices 4, 5 have, for their intended operation, transmitters and/or receivers for transmitting and/or receiving signals 7 by means of an electromagnetic carrier wave. At least one these signals 7 transmitted between the second device 5 and the first device 4 is an encoded, electromagnetic operating signal. The encoded operating signal 7 serves to authenticate the second device 5, by which means, after positive evaluation of the transmitted operating signal 7 when the second device 5 is authorized, it is possible to bring about a change in the state of the first device 4. The transmission of the encoded operating signal 7 takes place when the authorized user 2 activates the door handle 16 on the car door 6 or approaches the door handle 16. As result, the unlocking of the car doors 6 is triggered in accordance with the keyless entry functionality. Likewise, the transmission of the encoded operating signal 7 can also take place automatically without intervention by the user 2, as soon as the user enters the effective range 8, which is, however, not considered in more detail below. If the user closes the car doors 6 from the outside, automatic locking of the car doors 6 takes place. Likewise, the automatic locking of the car doors 6 can take place after the user 2 has exited the effective range 8.

The lock system 3 also detects the driving authorization for the motor vehicle 1. For this purpose, the first device 4, which is embodied as a control device, also brings about the unlocking and/or locking of the ignition lock (electronic ignition lock) and/or of the steering wheel lock (electrical steering wheel lock) in accordance with the two states. Likewise, another functionally relevant component of the motor vehicle 1 can be correspondingly actuated by the first device 4. For example, by this means it is possible to activate and/or deactivate an immobilizer, the engine control unit or the like. The transmission of the encoded operating signal 7 for authenticating the second device 5 takes place when the authorized user 2 is located in the motor vehicle 1 and activates a start/stop switch. As a result, the start process or the like of the motor vehicle 1 is triggered in accordance with the keyless go functionality.

The transmission of the signal 7 for the keyless entry/go functionality is triggered by activation of a switch and/or of a sensor by the user 2. For access authorization this may comprise, for example, the manual activation of the door handle 16, of the rear handle or the like. For this purpose, a switch is arranged in the door handle 16, rear handle or the like of the motor vehicle 1. If an approximation sensor which, for example, operates capacitively is used, the approaching of the hand of the user 2 to the door handle 16 or the rear handle can be detected by the sensor. For the driving authorization, the start/stop switch which can be activated manually by the user 2 is located in the motor vehicle 1. The start/stop switch is expediently arranged on the gear shift lever, on the ignition lock, in the dashboard, in the center console or the like in the motor vehicle 1.

Figure 2:
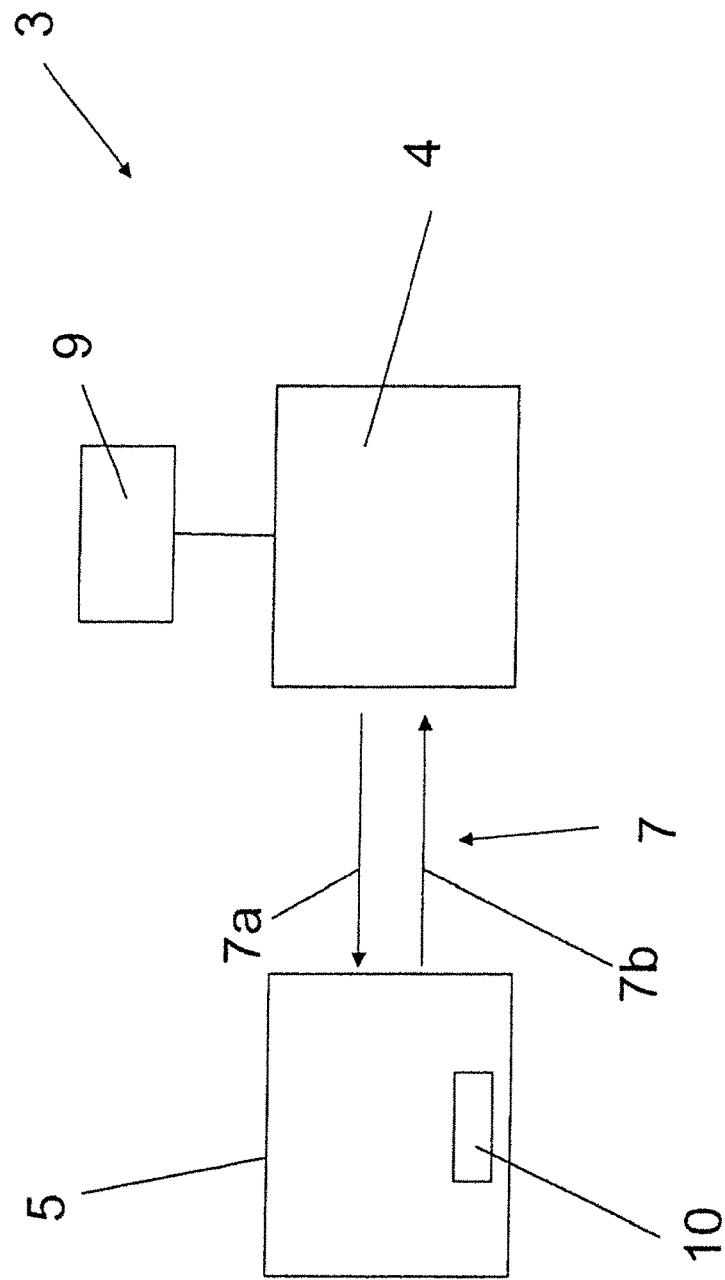
FIG. 2 shows a schematic block diagram of the lock system.
Figure 3:
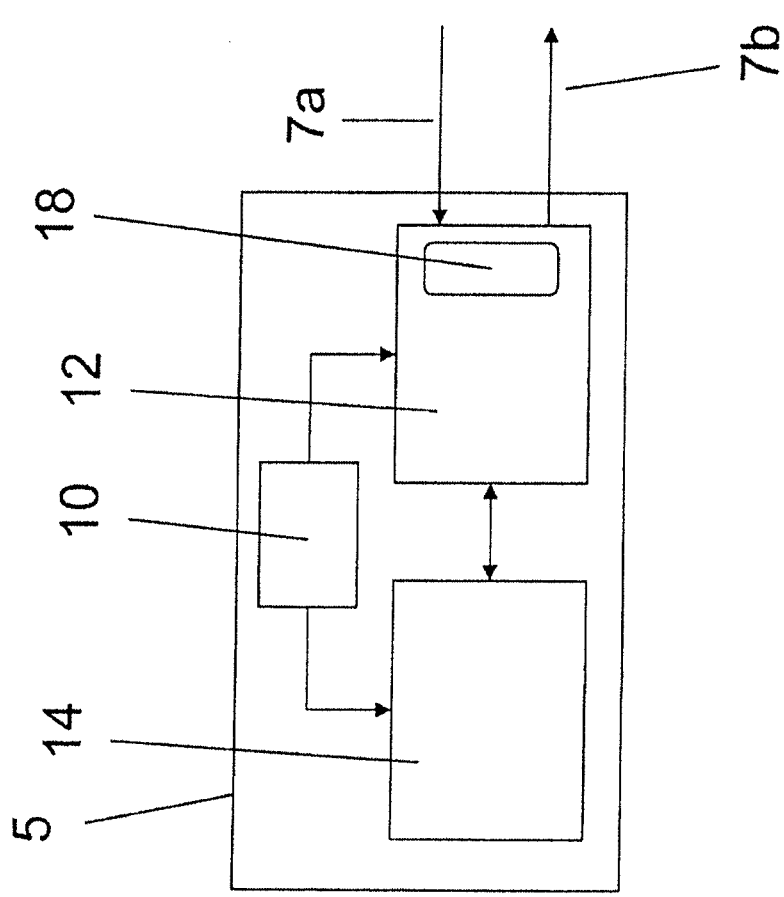
FIG. 3 shows a block diagram relating to the more detailed configuration of the second device of the lock system.
Figure 4:
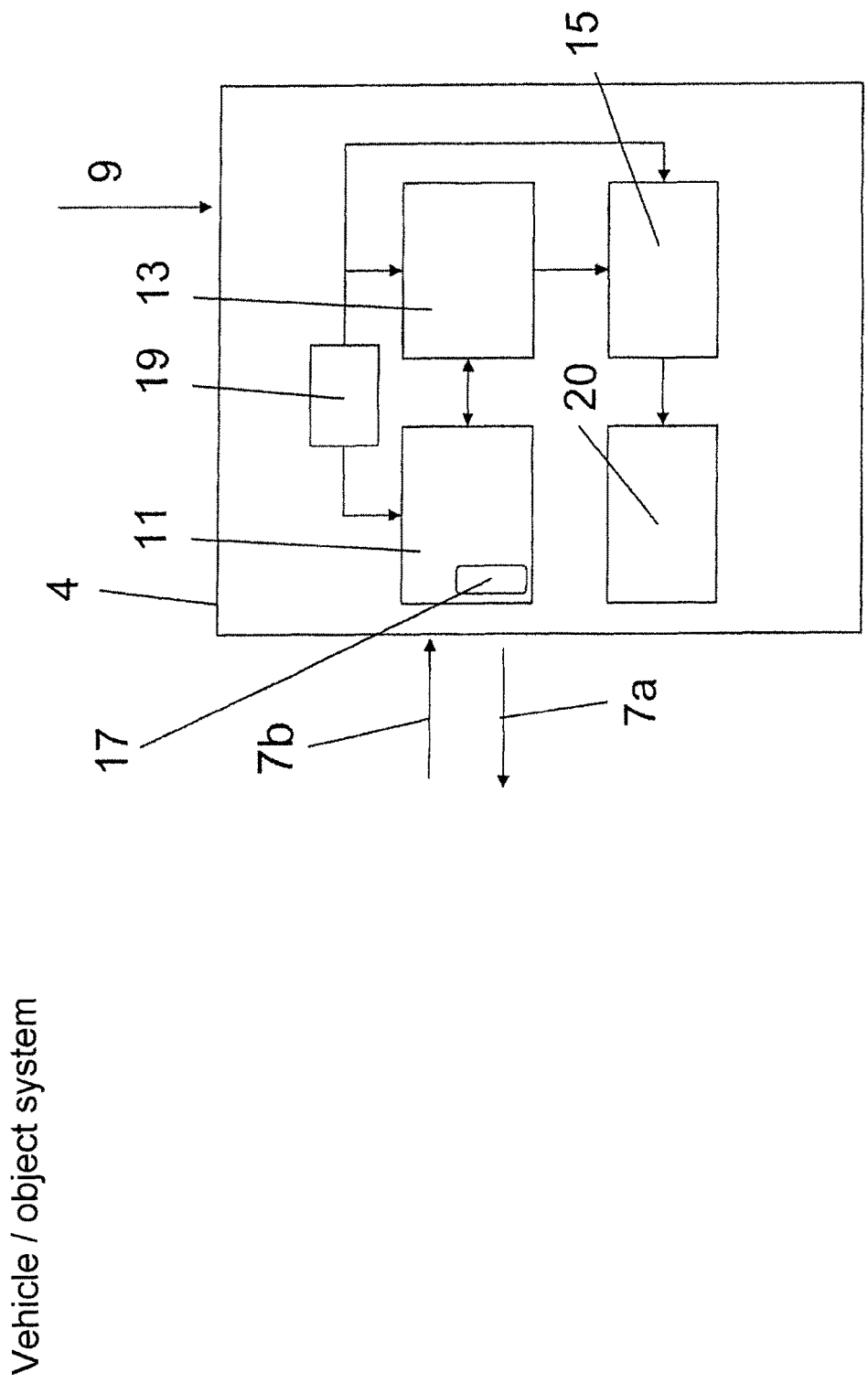
FIG. 4 shows a block diagram relating to the more detailed configuration of the first device of the lock system.

More precise configuration of the lock system 3 will be presented with reference to FIG. 2 to FIG. 4. As is apparent in FIG. 2, the communication between the first device 4 and the second device 5 takes place by means of the signal 7, wherein signals 7a are transmitted from the first device 4 to the second device 5, and signals 7b are transmitted from the second device 5 to the first device 4. In order to transmit the signals 7a, 7b, according to FIG. 3 the second device 5 has a transmitter and/or receiver 12, and according to FIG. 4 the first device 4 has a transmitter and/or receiver 11. In order to generate and/or evaluate the encoded operating signal 7 an authentication unit 13, 14 is respectively arranged in the first device 4 and in the second device 5. Finally, as is also apparent from FIG. 4, in the first device 4 there is also an actuator 15 which can be actuated by the authentication unit 13 and is operatively connected to the locking and/or unlocking mechanism 20 and, for its part, activates the locking and/or unlocking mechanism 20 for the car door 6, the tailgate or the like after positive authentication of the second device 5. Such a door lock with a locking and/or unlocking mechanism 20 is expediently arranged in the car door 6 and/or the tailgate.

As is also apparent from FIG. 2, the first device 4 is electrically connected to the rechargeable vehicle battery 9 as a first energy store. The first energy store 9 serves to supply energy to the first device 4 for the intended operation thereof. In the second device 5, there is a replaceable key battery 10 as a second energy store. The second energy store 10 serves to supply energy to the second device 5 for the intended operation thereof. After a certain operating period, the second energy store 10 can be exhausted. Likewise, the first energy store 9 may be flat in emergency situations. In these situations, the intended operation of the key system 3 is not possible. The more detailed configuration of the lock system 3 for the emergency operation thereof in such situations is explained in more detail below.

As is apparent in FIG. 4, the first device 4 is assigned an energy transmission means 17 for transmitting energy from the first energy store 9. In the present case, the energy transmission means 17 is a coil of the type of an LF (Low Frequency) coil. The second device 5 comprises a transponder 18, wherein the transponder 18 can be a passive RFID (Radio Frequency Identification) transponder such that energy can be transmitted from the first energy store 9 to the second device 5 by means of the energy transmission means 17, for the emergency operation of the second device 5 when the second energy store 10 is exhausted, as is seen in FIG. 3. This energy for the emergency operation is transmitted here by means of the signal 7a. Furthermore, the first device 4 is assigned an emergency battery 19 with such a storage capacity that the energy of the emergency battery 19 is sufficient, when the first energy store 9 is exhausted, for the emergency operation of the first device 4 with at least one one-off, in particular one repeated, change in the state of the first device 4. In particular, the locking and/or unlocking mechanism 20 can be activated at least once by means of the actuator 15, using this energy from the emergency battery 19.

The energy transmission means 17 and, in particular, the coil of the type of an LF (Low Frequency) coil 17 can expediently be arranged in the region of the door handle 16, integrated in and/or on the car door 6, as is apparent from FIG. 1. As already mentioned, the encoded operating signal 7a, 7b for authenticating the second device 5 can be transmitted by means of the transponder 18 and the energy transmission means 17, in addition to the supply of energy by means of the energy transmission means 17 for the second device 5, when the second energy store 10 is exhausted. In other words, in the case of a flat key battery 10, the key 5 is, for the purpose of communication and supply of energy to the key 5, held in front of the door handle 16, against the LF coil 17, and starts an automatic communication including authentication. Given successful authentication, the car door 6 is unlocked by the locking and/or unlocking mechanism 20. An emergency key is, in this respect, no longer necessary.

When the first energy store 9 is exhausted, the emergency energy supply of the first device 4 is provided via the emergency battery 19. The encoded operating signal 7a, 7b for authenticating the second device 5 is in turn transmitted by means of the transponder 18 and the energy transmission means 17. In other words, when the vehicle battery 9 is flat, but the key battery 10 is functional, the key 5 is also held in front of the door handle 16. Pressing the radio-remote-control button on the key 5 causes the transponder 18 to communicate actively with the coil 17 which is integrated in the vehicle handle 16. The receiver side in the car door 6 is supplied by a small emergency battery 19 if the vehicle battery 9 can no longer supply sufficient energy. In order to ensure the functional capability of the emergency supply, the state of the emergency battery 19 is expediently monitored by means of a diagnostic control unit such that when necessary the emergency battery 19 can be replaced within the scope of servicing operations for the vehicle 1.

When the second energy store 10 is exhausted, the driving authorization can also be activated by means of the transponder 18 which is located in the second device 5. For this purpose, a further energy transmission means 21, specifically in this case again a coil of the type of an LF (Low Frequency) coil 21, is provided in the motor vehicle 1, for transmitting energy from the first energy store 9 to the second device 5. The further energy transmission means 21 is arranged in the region of the center console in the motor vehicle 1, as is indicated schematically in FIG. 1. In other words, the necessary energy for the communication for starting the vehicle 1 when the key battery 10 is flat comes from the LF coil 21 in the center console. The transponder 18 and the LF coils 17, 21 preferably operate with an RFID frequency in the kilohertz range. However, it is, of course, also possible to select an RFID frequency in the megahertz range or gigahertz range.

Figure 5:
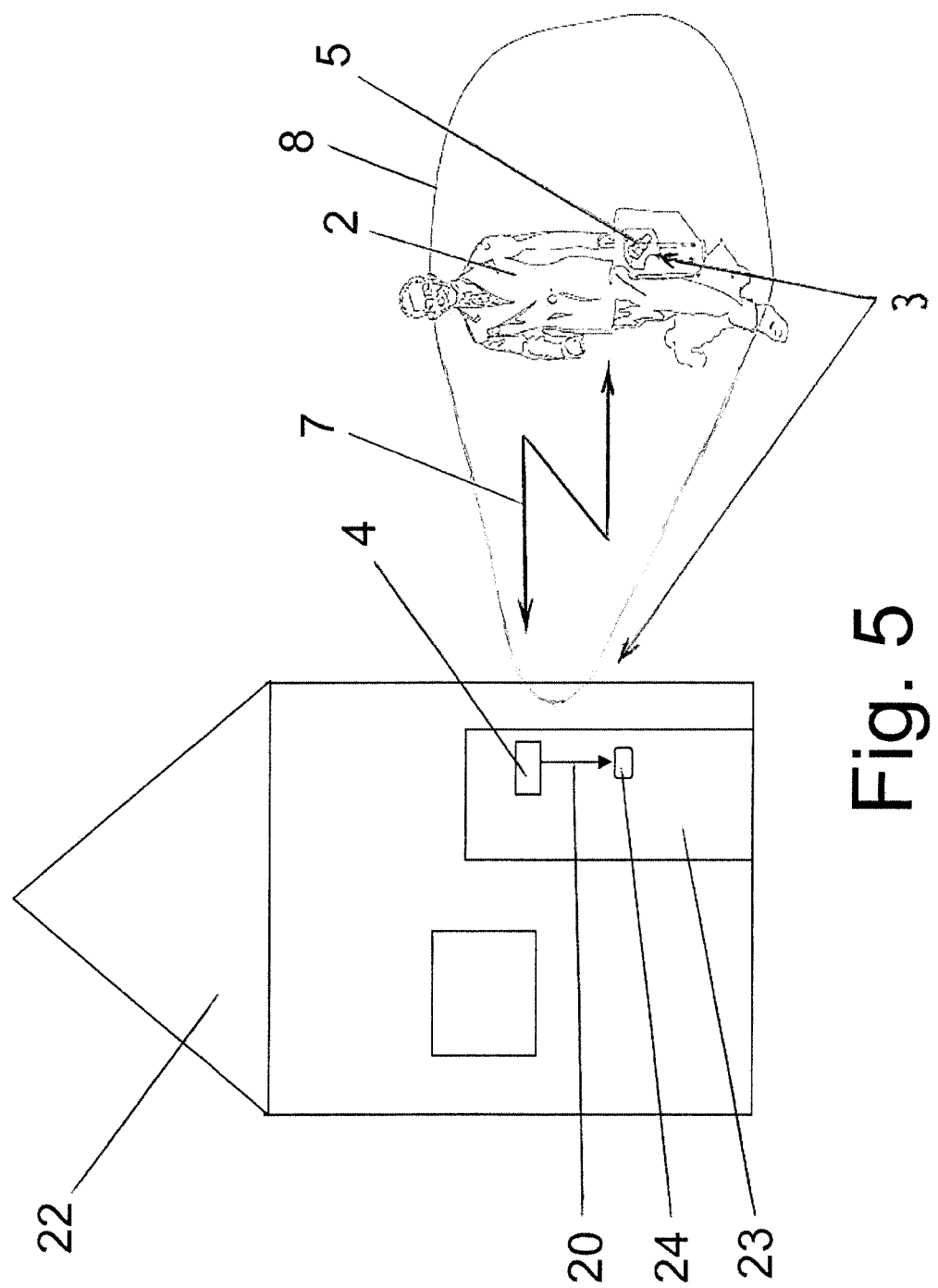
FIG. 5 shows a building which is equipped with a lock system.

A further exemplary embodiment of an apparatus according to the present invention with a lockable and/or unlockable lock element 23 can be seen in FIG. 5. The lock element 23 in the figure is the house door of a building 22. The house door 23 of the house 22 is equipped with a lock system 3, which again comprises a first device 4, which has at least two states and is embodied as a control device, and an associated second device 5, which is in the possession of the authorized user 2 and is embodied in the manner of an electronic key, and an ID signal transmitter, a chip card or the like. According to FIG. 3 and FIG. 4, the two devices 4, 5 have, for their intended operation, transmitters and/or receivers 11, 12 for electromagnetic signals 7. At least one of the signals 7 which is transmitted between the second device 5 and the first device 4 is an encoded operating signal for authenticating the second device 5, with the result that after positive evaluation of the transmitted operating signal 7 when the second device 5 is authorized it is possible to bring about a change in state of the first device 4. Unlocking of the locking and/or unlocking mechanism 20 in the door lock 24 of the house door 23 occurs on the basis of this change in state of the first device 4.

As has already been described above with reference to FIG. 2, a first energy store 9 for supplying energy to the first device 4 for the intended operation thereof and a second energy store 10 for supplying energy to the second device 5 for the intended operation thereof are again provided. According to FIG. 4, the first device 4 is assigned an energy transmission means 17 of the type of an LF (Low Frequency) coil for transmitting energy from the first energy store 9. According to FIG. 3, the second device 5 comprises a transponder 18 such that energy can be transmitted from the first energy store 9 to the second device 5 by means of the energy transmission means 17 for the emergency operation of the second device 5 when the second energy store 10 is exhausted. According to FIG. 4, the first device 4 is assigned an emergency battery 19 with such a storage capacity that the energy thereof is sufficient, when the first energy store 9 is exhausted, for the emergency operation of the first device 4 with at least one one-off, in particular one repeated, change in the state of the first device 4. It is also to be mentioned here that the first device 4 in the building 22 can also be supplied with energy from the power grid 9 for the operation of the first device 4, with the result that the emergency battery 19 is used for emergency operation in the event of a power grid failure.

The present invention is not limited to the described and illustrated exemplary embodiment. The present invention also comprises all developments of which a person skilled in the art is capable within the scope of the patent claims. Such a lock system can, therefore, be used not only in a motor vehicle or in a house. Use for a door lock on some other door or for a lock on some other lock element, for example on a folding lid for a container, or for emergency unlocking for other lockable objects, is also possible.

LIST OF REFERENCE NUMBERS

1: Motor vehicle/vehicle
2: (authorized) User
3: Lock system
4: First device
5: Second device/key
6: Car door
7: Signal/operating signal
7a: Signal (from the first device to the second device)/operating signal
7b: Signal (from the second device to the first device)/operating signal
8: Effective range
9: First energy store/vehicle battery/power grid
10: Second energy store/key battery
11,12: Transmitter and/or receiver
13,14: Authentication unit
15: Actuator
16: Door handle/vehicle handle
17: Energy transmission means/LF coil
18: Transponder
19: Emergency battery
20: Locking and/or unlocking mechanism
21: Further energy transmission means/LF coil
22: Building/house
23: Lock element/house door
24: Door lock

The invention claimed is:

1. A lock system for access authorization in a motor vehicle, which has a keyless entry/go functionality, comprising
a first device which has at least two states and is embodied as a control device for unlocking and/or locking one of a car door and a tailgate, and
having an associated second device which is embodied in a manner of an electronic key, an ID signal transmitter, or a chip card,
wherein the two devices have, for their intended operation, transmitters and/or receivers for electromagnetic signals,
wherein at least one of the signals transmitted between the second device and the first device is an encoded operating signal for authenticating the second device, which after a positive evaluation of the transmitted operating signal, the second device is authorized to bring about a change in state of the first device, and
having a first energy store for supplying energy to the first device for the intended operation thereof and
having a second energy store for supplying energy to the second device for the intended operation thereof,
the first device comprising a first coil of a type of an LF (Low Frequency) coil as an energy transmission means for transmitting energy from the first energy store, with the second device comprising a transponder such that energy can be transmitted from the first energy store to the second device by means of the energy transmission means for an emergency operation of the second device when the second energy store is exhausted, the emergency operation allowing authentication of the second device and control, by the second device, of state of the first device,
wherein the first device is arranged in the one of a car door and a tailgate, the first device comprising an emergency battery, and both a locking and/or unlocking mechanism and an actuator, such that the actuator is operatively connected directly to the locking and/or unlocking mechanism, with the actuator activating the locking and/or unlocking mechanism after positive authentication of the second device, and the actuator is directly connected to the emergency battery, which has a storage capacity such that when the first energy store is exhausted, energy from the emergency battery is sufficient for the emergency operation of the first device with at least one one-time change in the state of the locking and/or unlocking mechanism via the actuator,
wherein a state of the emergency battery is monitored by means of a diagnostic control unit in such a way that when necessary the emergency battery can be replaced, and
wherein a second coil of a type of an LF (Low Frequency) coil is arranged in a region of a center console as a further energy transmission means for transmitting energy from the first energy store to the second device, such that when the second energy store is exhausted driving authorization can be activated by the transponder in the second device, and the transmitted energy from the first energy store to the second device is used for starting the motor vehicle.

2. The lock system as claimed in claim 1,
wherein the energy transmission means of the first coil of the type of an LF (Low Frequency) coil, is arranged on a lock element, in a region of a door handle in and/or on the car door, and
wherein when the second energy store is exhausted, the encoded operating signal for authenticating the second device is transmitted by the transponder and the energy transmission means of the first coil of the type of an LF (Low Frequency) coil transmits the energy to the second device.

3. The lock system as claimed in claim 1, wherein when the first energy store is exhausted, the encoded operating signal for authenticating the second device is transmitted by the transponder and the energy transmission means.

4. The lock system as claimed in claim 1,
wherein the transponder is a passive RFID (Radio Frequency Identification) transponder, and
wherein the transponder preferably operates with an RFID frequency in the kilohertz or megahertz or gigahertz range.

5. The lock system as claimed in claim 1,
wherein the locking and/or unlocking mechanism is arranged in a lock element of a door lock in the car door, and
wherein the actuator also triggers the locking and/or unlocking mechanism for the door lock after positive authentication of the second device.

6. An apparatus having a lockable and/or unlockable lock element and having a lock system, wherein the lock system is as claimed in claim 1.

7. The apparatus as claimed in claim 6, wherein the lock element is in one of a house door for a building, a folding lid for a container, and a car door for a motor vehicle.

* * * * *